(12) United States Patent
Hoeben

(10) Patent No.: US 8,777,827 B2
(45) Date of Patent: Jul. 15, 2014

(54) DEVICE HAVING A ROTATIONAL ELEMENT FOR FORMING SLEEVE-LIKE FOIL ENVELOPES

(75) Inventor: Wilhelmus Johannes Franciscus Hoeben, Deurne (NL)

(73) Assignee: Fuji Seal International, Inc., Osaka (JP)

( * ) Notice: Subject to any disclaimer, the term of this patent is extended or adjusted under 35 U.S.C. 154(b) by 583 days.

(21) Appl. No.: 12/448,964

(22) PCT Filed: Jan. 10, 2008

(86) PCT No.: PCT/NL2008/000010
§ 371 (c)(1),
(2), (4) Date: Jul. 30, 2009

(87) PCT Pub. No.: WO2008/088210
PCT Pub. Date: Jul. 24, 2008

(65) Prior Publication Data
US 2010/0093507 A1    Apr. 15, 2010

(30) Foreign Application Priority Data
Jan. 17, 2007 (NL) ........................ 1033245

(51) Int. Cl.
*B31B 1/26* (2006.01)
(52) U.S. Cl.
USPC ............... 493/235; 493/236; 493/269
(58) Field of Classification Search
USPC ............ 493/235, 236, 269, 287, 290; 53/298,
53/291, 292, 296, 585
See application file for complete search history.

(56) References Cited

U.S. PATENT DOCUMENTS

| | | | |
|---|---|---|---|
| 3,304,820 A | | 2/1967 | Muller et al. |
| 3,347,119 A | | 10/1967 | Sarka |
| 3,448,646 A | | 6/1969 | Bishop |
| 3,774,509 A | * | 11/1973 | Heinzer ............. 493/235 |
| 4,098,158 A | | 7/1978 | Escales et al. |
| 4,361,260 A | | 11/1982 | Hanlan |
| 4,384,500 A | | 5/1983 | Friberg |
| 4,497,156 A | * | 2/1985 | Scheidegger ............. 53/399 |
| 4,519,868 A | | 5/1985 | Hoffmann |

(Continued)

FOREIGN PATENT DOCUMENTS

| | | |
|---|---|---|
| FR | 2 738 797 B1 | 12/1997 |
| GB | 2 256 828 A | 12/1992 |
| JP | A-63-191726 | 8/1988 |
| JP | B-6-98973 | 12/1994 |

*Primary Examiner* — Sameh H. Tawfik
(74) *Attorney, Agent, or Firm* — Oliff PLC

(57) ABSTRACT

The invention relates to a device for forming sleeve-like foil envelopes from a continuous flat strip of a sleeve-like foil material, comprising supply means (12) for supplying the continuous flat strip of sleeve-like foil material (1), cutting means for making a cut in this strip of sleeve-like foil material over the full width thereof so as to obtain the individual sleeve-like foil envelopes, as well as discharge means (20a-20b) for discharging the individual sleeve-like foil envelopes from the device. The device of the invention is characterized in that the device comprises rotational element means (20') arranged for imparting a rotary motion during operation to the sleeve-like envelope to be discharged from the device. By imparting a rotary motion to an individually formed sleeve-like foil envelope while it is being discharged from the device it is achieved that the foil envelope will remain open, making it possible to place the envelope round a container in a simple and effective manner.

12 Claims, 4 Drawing Sheets

(56) References Cited

U.S. PATENT DOCUMENTS

| | | |
|---|---|---|
| 4,545,181 A | 10/1985 | Frankefort |
| 4,719,575 A | 1/1988 | Gnuechtel |
| 4,737,904 A | 4/1988 | Ominato |
| 4,806,187 A * | 2/1989 | Fujisawa .................. 156/86 |
| 4,910,941 A * | 3/1990 | Nagano et al. .................. 53/291 |
| 4,922,683 A | 5/1990 | Connolly |
| 4,955,265 A | 9/1990 | Nakagawa et al. |
| 4,983,155 A | 1/1991 | Stobb |
| 5,070,680 A | 12/1991 | Nagano |
| 5,103,703 A | 4/1992 | Littleton |
| 5,241,884 A | 9/1993 | Smithe et al. |
| 5,286,317 A | 2/1994 | Treat et al. |
| 5,470,300 A | 11/1995 | Terranova |
| 5,586,479 A | 12/1996 | Roy et al. |
| 5,588,278 A * | 12/1996 | Wynn et al. .................. 53/399 |
| 5,735,785 A | 4/1998 | Lucas et al. |
| 5,740,709 A | 4/1998 | Boston et al. |
| 5,777,879 A | 7/1998 | Sommerfeldt |
| 5,791,220 A | 8/1998 | Liao |
| 5,799,556 A | 9/1998 | Straub |
| 6,016,641 A | 1/2000 | Nagano |
| 6,160,609 A | 12/2000 | Inoue |
| 6,289,777 B1 | 9/2001 | Hartmann et al. |
| 6,966,164 B2 * | 11/2005 | Navarro et al. .................. 53/399 |
| 6,997,225 B2 * | 2/2006 | Hong .................. 156/459 |
| 7,028,598 B2 | 4/2006 | Teshima |
| 7,100,484 B2 | 9/2006 | Maddalon |
| 7,121,177 B2 | 10/2006 | Hatano |
| 7,182,007 B2 | 2/2007 | Berge et al. |
| 7,207,249 B1 | 4/2007 | Smith et al. |
| 7,255,030 B2 | 8/2007 | Benjaminsson |
| 7,398,811 B1 * | 7/2008 | Duncan et al. .................. 156/392 |
| 7,430,948 B2 | 10/2008 | DeMarco et al. |
| 7,484,445 B2 | 2/2009 | DeMarco et al. |
| 2003/0033915 A1 | 2/2003 | Glemser et al. |
| 2004/0173073 A1 | 9/2004 | Wilkes |
| 2007/0240549 A1 | 10/2007 | Van Heck et al. |

* cited by examiner

DEVICE HAVING A ROTATIONAL ELEMENT FOR FORMING SLEEVE-LIKE FOIL ENVELOPES

CROSS-REFERENCE TO RELATED APPLICATIONS

This application is the U.S. National Stage of International Application No. PCT/NL2008/000010 filed Jan. 10, 2008, the entire disclosures of which are incorporated herein by reference.

BACKGROUND OF THE INVENTION

The invention relates to a device for forming sleeve-like foil envelopes from a continuous flat strip of a sleeve-like foil material, comprising supply means for supplying the continuous flat strip of sleeve-like foil material, cutting means for making a cut in this strip of sleeve-like foil material over the full width thereof so as to obtain the individual sleeve-like foil envelopes, as well as discharge means for discharging the individual sleeve-like foil envelopes from the device.

Such a device is for example disclosed in European patent publication No. 0 109 105. With said device individual sleeve-like foil envelopes are realized in one cutting motion, which individual, flat, sleeve-like foil envelopes must subsequently be opened and be placed around an object, such as a bottle or other container, with a slight oversize. The foil material that is used is made of a so-called "shrink material", which will shrink under the influence of heat being supplied thereto and conform tightly to the shape of the bottle or other container around which the foil envelope has been placed.

In the aforesaid application, the foil envelope has already been produced in the form of a continuous strip wound on a roll, which needs to be cut to the correct length by means of a device as referred to in the introduction. To that end, the cutting means are driven in dependence on the length, in such a manner that they cut the strip of sleeve-like foil material to the correct length, after which the individual sleeve-like foil envelope thus formed is discharged from the device and opened, to be subsequently placed around the container in a manner which is known per se.

A drawback of the device that is currently known is that it is only suitable for use with thick or stiff foil materials in order to thus realize a high processing speed. When thinner or more flexible foil materials are used, the processing speed must be reduced in order to prevent undesirable jamming of the device.

SUMMARY OF THE INVENTION

The object of the invention is to obviate the above drawbacks and to provide a device as referred to in the introduction, in which large numbers of foil envelopes of varying length and varying types of material can be produced at a high processing speed.

According to the invention, the device is to that end characterized in that the device comprises means arranged for imparting a rotary motion during operation to the sleeve-like envelope to be discharged from the device.

By imparting a rotary motion to an individually formed sleeve-like foil envelope, while it is being discharged from the device, it was found that the foil envelope will remain open, making it possible to place the envelope round a container in a simple and effective manner. It is a well known fact that, in particular, thin and flexible foil materials exhibit a tendency to return from their open position to their flat position before they have been effectively placed round the container. In such situations the device will block up and jam, which is undesirable. When a rotary motion is imparted, the sleeve-like foil envelope will remain open better, if not longer, and will less easily tend to take up its flat position.

According to a special embodiment, the rotation means comprise at least one rotatably driveable roller, which can be brought into abutment with the sleeve-like foil envelope to be discharged.

More specifically, the rotatable driving roller is disposed at an angle relative to the supplying direction of the flat strip of sleeve-like foil material, so that in addition to a rotation component also a translation component can be imparted to the foil envelope to be discharged. This latter aspect is necessary for discharging the foil envelope from the device and placing it round a container.

It has been found that the angle in question effectively ranges between 30° and 80° so as to impose a rotation as well as a translation to the foil envelope to be discharged and prevent the foil envelope from blocking up and causing the device to jam.

In another functional embodiment, the rotation means comprise a nozzle that can be directed at the sleeve-like foil envelope to be discharged from the device for delivering a medium under pressure, in particular compressed air. In this way, too, a rotary motion can be imparted to the foil envelope to be discharged in an effective and controllable manner.

A simple construction comprising a limited number of parts is realized if according to the invention the rotation means form part of the discharge means.

BRIEF DESCRIPTION OF THE DRAWINGS

The invention will now be explained in more detail with reference to a drawing, in which.

For a better understanding of the invention, like parts will be indicated by identical reference numerals in the description of the figures below.

DETAILED DESCRIPTION OF THE INVENTION

Figure 1:
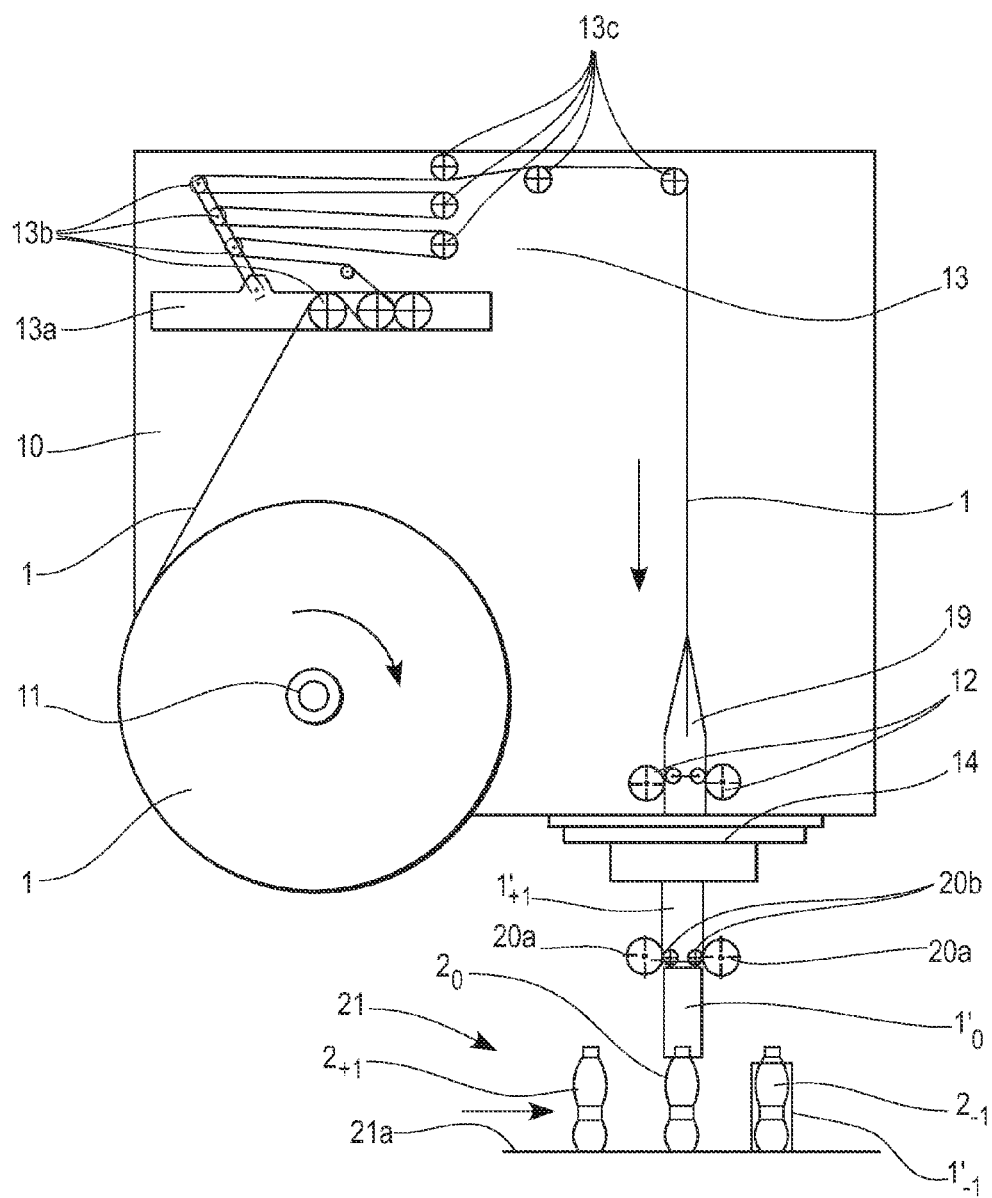
FIG. 1 shows an embodiment of a device according to the prior art.

In FIG. 1, numeral 10 indicates a device according to the prior art. The device 10 comprises supply means or moving means 12 made up of two driveable rollers, between which a continuous strip of foil material 1 can be carried. The continuous strip of foil material 1 is wound on a supply reel 11 and is introduced into the device via a tensioning mechanism 13. The tensioning mechanism 13 has an arm 13a, which is pivotally connected to the device. The pivot arm 13a comprises several rollers 13b, over which the continuous strip of sleeve-like foil material 1 is passed. The strip of sleeve-like foil material 1 is also passed over additional, fixedly disposed rollers 13c. In this way it is possible to realize a certain supply of but above all also a certain tension of the continuous strip of sleeve-like foil material being unwound from the reel 11.

The supply means 12 carry the continuous strip of sleeve-like material 1 past cutting means 14 for cutting the foil material through at predetermined intervals so as to obtain individual sleeve-like foil envelopes V. The cutting means may be configured in various ways, which may be considered to be known to the skilled person. Disposed at the location of the cutting means 14 and the discharge side of the device 10 is a spreading element 19, which functions to open the obtained individual, flat, sleeve-like foil envelopes 1' for the purpose of placing the opened, sleeve-like foil envelope around a container.

As is clearly shown in FIG. 1, the spreading element 19 is enlarged at least in the plane perpendicular to the plane of the flat, continuous strip of foil material 1. Thus the individual, flat, sleeve-like foil envelopes, $1'_{-1}$, $1'_0$, $1'_{+1}$ are opened, so that they can be easily placed around a container, $2_{-1}$, $2_0$, $2_{+1}$. The containers, $2_{-1}$, $2_0$, $2_{+1}$, are moved by conveying means 21, which are considered to be known per se, which conveying means 21 are provided with a carrier 21a, on which several containers (bottles, jars or cans) are present, which containers are carried to the device 10.

Each individual, flat, sleeve-like foil envelope, $1'_{-1}$, $1'_0$, $1'_{+1}$ is opened by the spreading element 19 and cut loose from the strip of foil material 1 by the cutting means 14, after which the sleeve-like foil envelope thus opened can be easily placed over a waiting container, $2_{-1}$, $2_0$, $2_{+1}$. The containers, $2_{-1}$, $2_0$, $2_{+1}$, in the sleeve-like foil envelopes $1'_{-1}$, $1'_0$, $1'_{+1}$ can now be discharged from the device 10 via the carrier 21a and be subjected to a heat treatment elsewhere, causing the sleeve-like envelope, $1'_{-1}$, $1'_0$, $1'_{+1}$ to shrink and conform tightly to the shape of the container.

To facilitate the discharge of the individual foil envelope $1'_{-1}$, $1'_0$, $1'_{+1}$, surrounding the container, $2_{-1}$, $2_0$, $2_{+1}$, discharge means 20a-20b may be provided, which are mounted in the device at the location of the spreading element 19. Said discharge means may comprise one or more driveable rollers 20a, which are supported on the stationary rollers 20b and which discharge the sleeve-like foil material 1' present therebetween from the device 10 at an accelerated rate, with the individual, opened foil envelope, $1'_{-1}$, $1'_0$, $1'_{+1}$ slipping over a container, $2_{-1}$, $2_0$, $2_{+1}$, as it were.

To place a sleeve-like foil envelope 1' around a container 2, the foil envelope must be placed in an open position by the spreading element 19 to enable easy and quick placement thereof around the container 2. Given the fact that increasingly thin and flexible foil materials are currently being used, as well as the fact that such devices are operated at high processing speeds, it has been found that the opened sleeve-like foil envelope, upon leaving the device 10 or the spreading element 19, tends to return to its flat shape before it has been placed around the container 2. This phenomenon results in the device 10 jamming and stopping, which is undesirable.

According to the invention, in order to retain the open position of the sleeve-like foil envelope as long as possible until the foil envelope 1' has been placed round the container, means are provided which impart a rotary motion on the sleeve-like foil envelope, $1'_{-1}$, $1'_0$, $1'_{+1}$ to be discharged from the device 10. Upon leaving the device 10 or the spreading element 19, the sleeve-like foil envelope thus discharged will make a rotary motion before slipping over or being placed around the container, $2_{-1}$, $2_0$, $2_{+1}$, in question.

Figure 2:
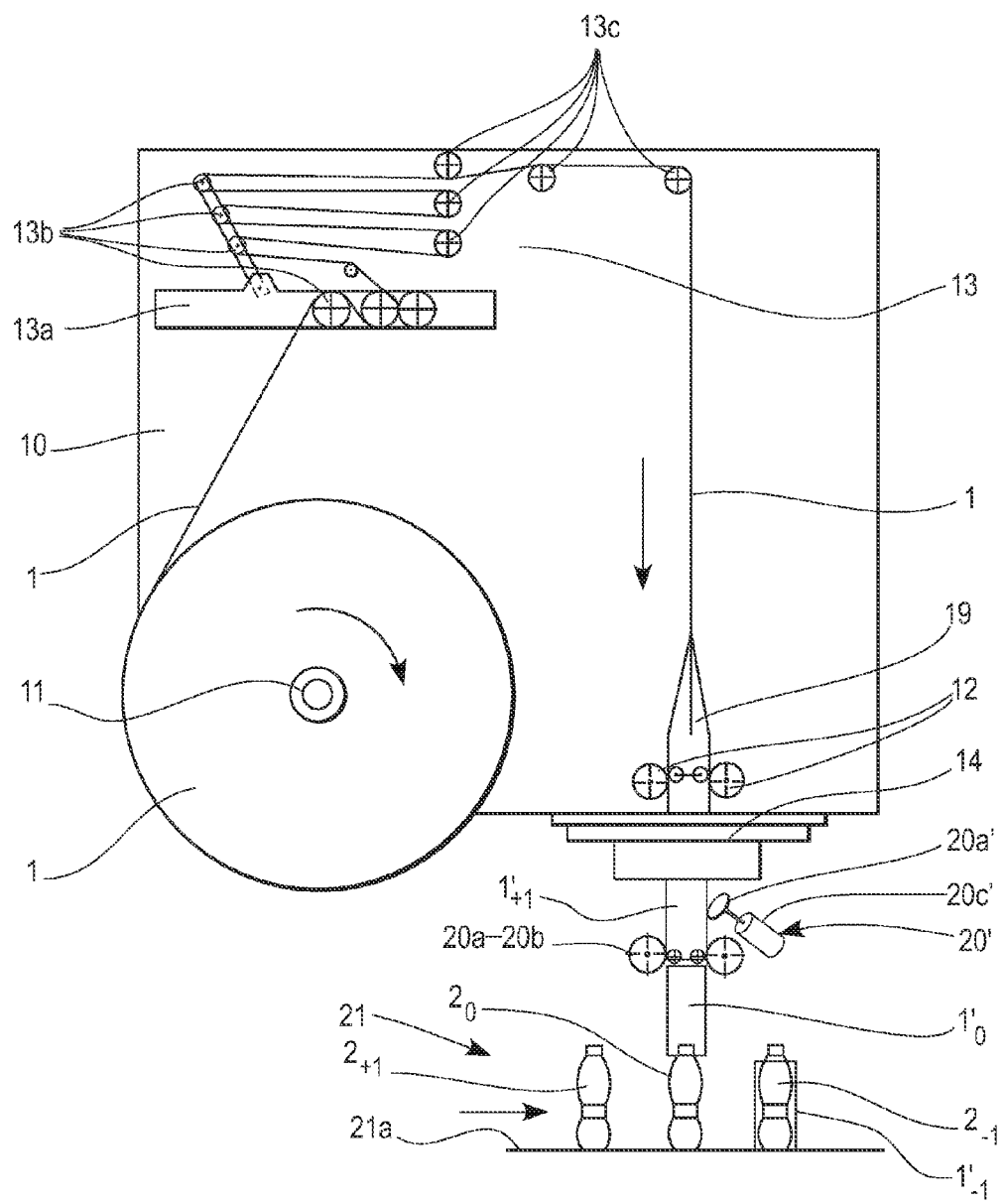
FIG. 2 shows an embodiment of a device according to the invention.

Such an embodiment of the device according to the invention is shown in FIG. 2, in which the rotation means are indicated by reference numeral 20'. In the embodiment shown in FIG. 2, said rotation means 20' are incorporated in the device as a supplement to the discharge means 20a-20b. The rotation means 20' comprise at least one rotatably driveable roller or driving wheel 20a', which can be brought into abutment with the sleeve-like foil envelope, $1'_{-1}$, $1'_0$, $1'_{+1}$, to be discharged. Said driving roller 20a' thus imparts a rotary motion to the foil envelope in question, whilst the discharge means 20a-20b, in synchronisation with the rotary motion of the foil envelope, discharge the foil envelope in question in the direction of the container 2 in question via a translating motion of the spreading element 19.

Figure 3:
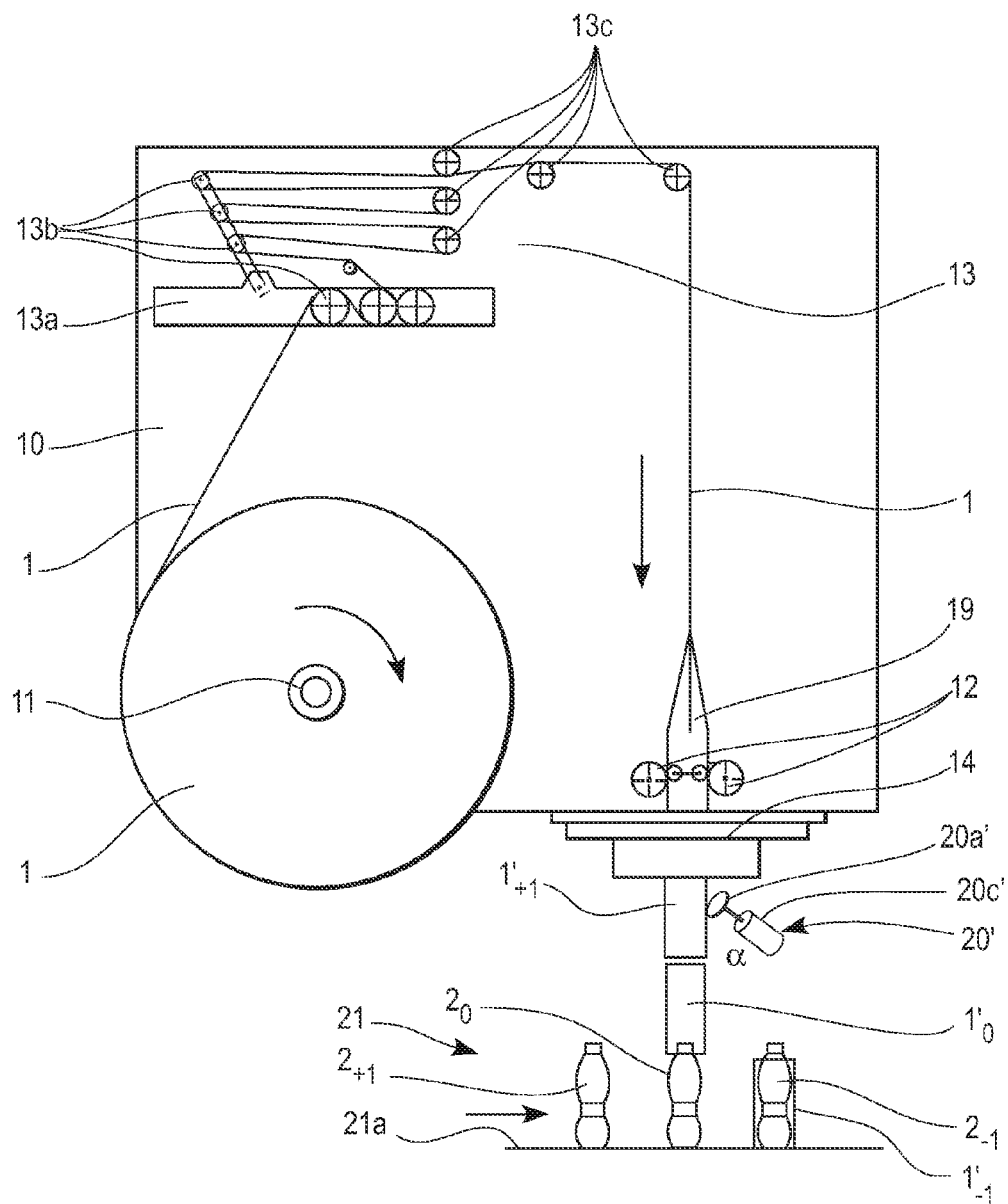
FIG. 3 shows a preferred embodiment of a device according to the invention.

Whilst in FIG. 2 the rotation means 20' are incorporated in the device 10 by way of supplement to the discharge means 20a-20b, the embodiment shown in FIG. 3 only makes use of the rotation means 20', generally including 20a' and 20c', which in this embodiment also function as discharge means for discharging an individually formed sleeve-like foil envelope, $1'_{-1}$, $1'_0$, $1'_{+1}$, from the device and from the spreading element 19.

It is essential in this regard that the rotation means 20' impart a rotary motion as well as a translating motion to the sleeve-like foil envelope in question, making it necessary to dispose the rotatable driving roller 20a' at an angle relative to the supplying direction of the flat strip of sleeve-like foil material. Said angle preferably ranges between 30° and 80°.

Figure 4:
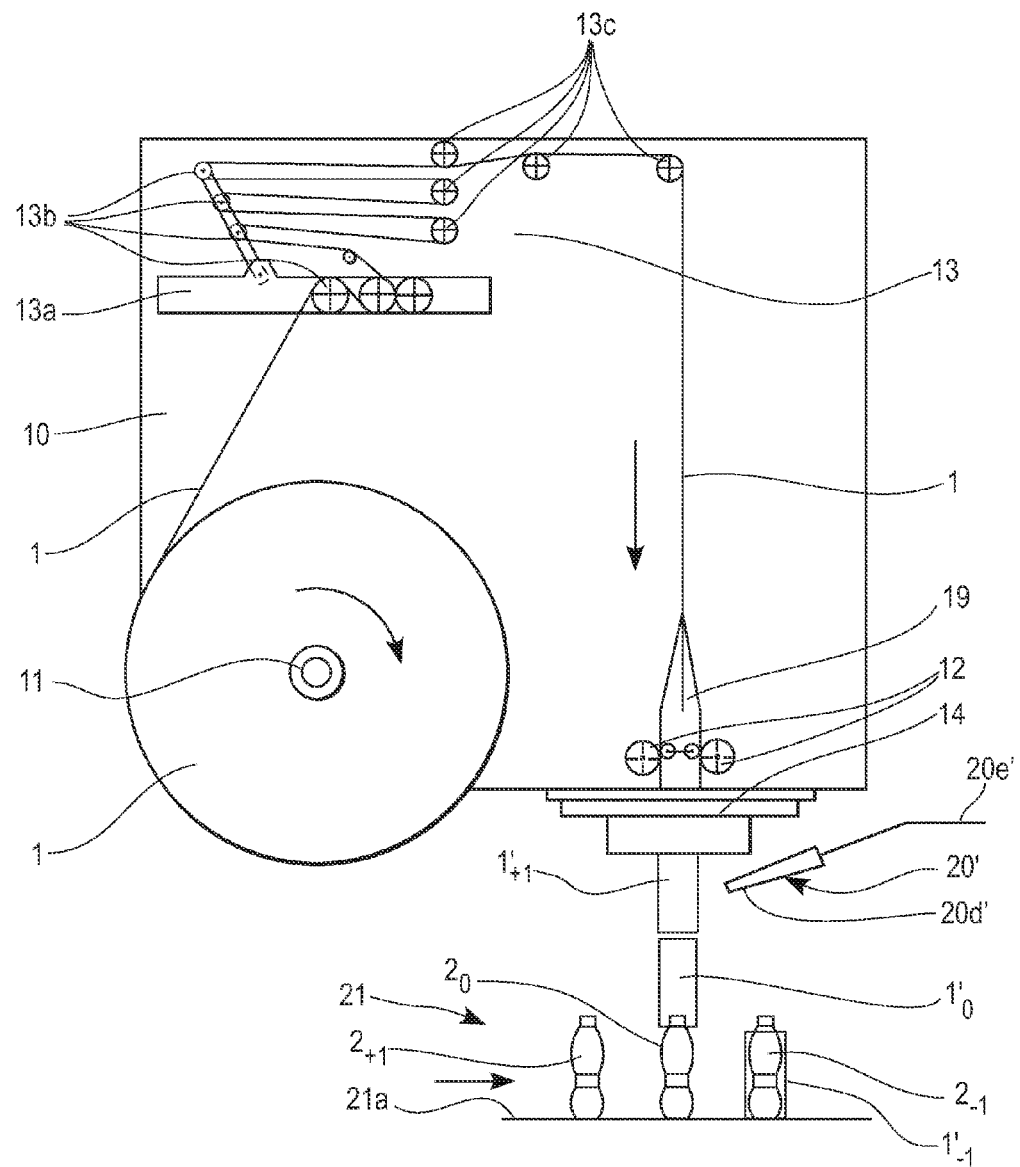
FIG. 4 shows an alternative embodiment of a device according to the invention.

FIG. 4 shows yet another embodiment of the rotation means 20', in this case comprising at least one nozzle 20d' which can be directed, whether or not at an angle, at the sleeve-like foil envelope, $1'_{-1}$, $1'_0$, $1'_{+1}$, to be discharged. The nozzle 20d' is connected, via a supply pipe 20e', to a source for a medium under pressure, for example a compressor or a pump. Via the nozzle 20d' a jet of a medium under pressure, in particular compressed air, is directed at the sleeve-like foil envelope to be discharged.

This embodiment, too, imparts a rotary motion as well as a translating motion to the sleeve-like foil envelope to be discharged so as to thus place a rotating sleeve-like foil envelope around the container 2 in question.

The invention claimed is:

1. A device for forming sleeve-like foil envelopes from a continuous flat strip of a sleeve-like foil material, the device comprising:
   a supply element for supplying the continuous flat strip of sleeve-like foil material;
   a cutting member for making a cut in the strip of sleeve-like foil material so as to form and separate individual sleeve-like foil envelopes from the strip of sleeve-like foil material;
   a rotation mechanism having an axis of rotation and disposed at a location downstream from the cutting member and in the path of the separate individual sleeve-like foil envelopes such that the rotation mechanism rotates about the axis of rotation to physically contact and concurrently impart both a rotary motion to the individual sleeve-like envelopes and a translation motion to said sleeve-like envelopes for discharging the individual sleeve-like foil envelopes from the device.

2. The device according to claim 1, wherein the rotation mechanism comprises at least one rotatable driving roller adapted for engaging the individual sleeve-like foil envelopes to be discharged.

3. The device according to claim 2, wherein the individual sleeve-like foil envelopes travel in a supplying direction and the at least one rotatable driving roller is disposed at an angle to the supplying direction.

4. The device according to claim 3, wherein said angle ranges between 30° and 80°.

5. The device according to claim 1, wherein the individual sleeve-like foil envelopes travel through the device in a supplying direction and are rotated immediately after they are formed and separated from the strip of sleeve-like foil material.

6. The device according to claim 1, wherein said rotation mechanism imparts a rotary motion to the individual sleeve-like envelopes substantially maintaining the speed of travel of the individual sleeve-like envelopes along the supplying direction.

7. The device according to claim 1 further comprising an opening element for opening the individual sleeve-like foil envelopes prior to their rotation, with the individual sleeve-like foil envelopes remaining open after their rotation.

8. The device according to claim 7 wherein the individual sleeve-like foil envelopes travel through the device in a supplying direction and said opening element is located upstream of said cutting member.

9. An apparatus for forming sleeve-like foil envelopes from a continuous flat strip of a sleeve-like foil material, the apparatus comprising:
   a supply element for supplying the continuous flat strip of sleeve-like foil material;
   a cutting member for making a cut in the strip of sleeve-like foil material so as to form and separate individual sleeve-like foil envelopes from the strip of sleeve-like foil material; and
   at least one rotatably drivable roller angularly having an axis of rotation and disposed at a location downstream from the cutting member and in the path of the separate individual sleeve-like foil envelopes such that the at least one rotatably drivable roller rotates about the axis of rotation to engage the individual sleeve-like foil envelopes to concurrently impart both a rotary motion and a translation motion to the individual sleeve-like foil envelopes for discharging the individual sleeve-like foil envelopes from the apparatus.

10. The apparatus of claim 9 wherein the at least one rotatably drivable roller is disposed at an angle between approximately 30° and 80°.

11. The apparatus of claim 9 further comprising an opening element adapted for opening the individual sleeve-like foil envelopes prior to their rotation, with the individual sleeve-like foil envelopes remaining open after their rotation.

12. An apparatus for forming sleeve-like foil envelopes from a continuous flat strip of a sleeve-like foil material, the apparatus comprising:
   a supplier of the continuous flat strip of sleeve-like foil material to advance the material along a supply path to a location downstream;
   a cutter disposed at a location downstream of the supplier and proximate the supply path to form and separate individual sleeve-like foil envelopes from the strip of sleeve-like foil material; and
   at least one rotatably drivable roller disposed at a location downstream from the cutter and in the supply path of the separate individual sleeve-like foil envelopes, the at least one rotatably drivable roller having an axis of rotation oriented at an oblique angle relative to the supply path of the separate individual sleeve-like foil envelopes, such that the at least one rotatably drivable roller rotates about the axis of rotation to engage the individual sleeve-like foil envelopes to concurrently impart both a rotary motion and a translation motion to the individual sleeve-like foil envelopes for discharging the individual sleeve-like foil envelopes from the apparatus.

\* \* \* \* \*